(12) United States Patent
Luttenbacher

(10) Patent No.: US 8,812,759 B2
(45) Date of Patent: Aug. 19, 2014

(54) BUS SUBSCRIBER DEVICE FOR CONNECTION TO A LINE-REDUNDANT DATA BUS, AND METHOD FOR CONTROLLING THE COMMUNICATION OF A BUS SUBSCRIBER WITH A LINE-REDUNDANT SERIAL DATA BUS

(71) Applicant: Softing AG, Haar (DE)

(72) Inventor: Josef Luttenbacher, Unterammergau (DE)

(73) Assignee: Softing AG, Haar (DE)

( * ) Notice: Subject to any disclaimer, the term of this patent is extended or adjusted under 35 U.S.C. 154(b) by 0 days.

(21) Appl. No.: 13/790,129

(22) Filed: Mar. 8, 2013

(65) Prior Publication Data
US 2013/0262723 A1    Oct. 3, 2013

(30) Foreign Application Priority Data
Mar. 8, 2012   (DE) .......................... 10 2012 101 957

(51) Int. Cl.
H04L 12/40     (2006.01)
G06F 13/42     (2006.01)
H04L 1/22      (2006.01)
H04L 1/00      (2006.01)

(52) U.S. Cl.
CPC ... *G06F 13/4282* (2013.01); *H04L 2012/40215* (2013.01); *H04L 2012/4026* (2013.01); *H04L 2012/40221* (2013.01); *H04L 2001/0094* (2013.01); *H04L 12/40182* (2013.01); *H04L 1/22* (2013.01)
USPC .......................................................... 710/106

(58) Field of Classification Search
USPC .......................................................... 710/106
See application file for complete search history.

(56) References Cited

U.S. PATENT DOCUMENTS 5,461,720 A * 10/1995 Beardsley et al. ............. 711/112
6,594,227 B1 * 7/2003 Ogawa et al. ................. 370/216

(Continued)

FOREIGN PATENT DOCUMENTS

| DE | 10 2010 015 455 A1 | 10/2011 |
| DE | 102010015455 A1 | 10/2011 |
| EP | 0 990 330 B1 | 1/2009 |
| WO | 98/14853 A1 | 4/1998 |

OTHER PUBLICATIONS

Office Action issued Oct. 30, 2012 in DE 10 2012 101 957.6 (11 pgs.) and an English language translation of German Office Action (10 pgs).

(Continued)

*Primary Examiner* — Nimesh G Patel
(74) *Attorney, Agent, or Firm* — Grossman, Tucker, Perreault & Pfleger, PLLC

(57) ABSTRACT

Bus subscriber device for connection to a line-redundant, serial data bus, over which data are exchanged according to a predefined protocol, having the following features: a data transmission unit, at least two data receiving units that are connected in parallel, a line selection logic and at least two bus communication interfaces for connecting to a corresponding number of lines of the data bus, wherein each of the data receiving units is connectable via an associated bus communication interface to an assigned line of the data bus and has means for receiving a data block from the associated line of the data bus and means for forwarding the received data block to the line selection logic, and wherein the line selection logic has means for selecting a line of the data bus as a receiving line and forwarding the data block received over the selected receiving line.

18 Claims, 2 Drawing Sheets

(56) References Cited

U.S. PATENT DOCUMENTS

| | | | |
|---|---|---|---|
| 6,973,029 B1 * | 12/2005 | Jantzen | 370/228 |
| 2005/0041653 A1 * | 2/2005 | Arnold et al. | 370/383 |
| 2006/0215691 A1 * | 9/2006 | Kobayashi et al. | 370/466 |
| 2010/0290339 A1 | 11/2010 | Balasubramanian et al. | |
| 2010/0332908 A1 * | 12/2010 | Johnsen et al. | 714/39 |

OTHER PUBLICATIONS

"Slave Redundancy;" Published by Profibus User Organization, version 1.2, Nov. 2004, document identification: TC4-4-0001, pp. 1-57.

Redundancy Link Module RLM01 for Profibus DP/FMS, ABB Automation Products, GmbH, Printed in Germany May 2002 (4 pgs).

European Search Report dated Jun. 25, 2013 issued in related European Application No. 13158008.6 (Publn No. EP2637362) [7 pgs].

* cited by examiner

BUS SUBSCRIBER DEVICE FOR CONNECTION TO A LINE-REDUNDANT DATA BUS, AND METHOD FOR CONTROLLING THE COMMUNICATION OF A BUS SUBSCRIBER WITH A LINE-REDUNDANT SERIAL DATA BUS

BACKGROUND

The disclosure relates in general to the field of communication on field buses that are implemented as serial asynchronous data buses. The disclosure is especially applicable to field bus systems, such as Profibus, Foundation Field bus, CAN (Controller Area Network), but also to Ethernet and others. A field bus connects field devices, such as sensors and actuators, in a single system for communicating with a computer. Communication takes place via bus-specific telegrams that are specified in a bus-specific protocol. Usually a field bus system comprises at least one master field device (Master) for controlling the system, as well as a plurality of slave field devices (Slaves).

To increase the availability of field bus systems it is known to provide line redundancy, master redundancy and/or slave redundancy in any desired combination.

Line redundancy means that the field bus is realized with at least two parallel, redundant conductors or lines A and B. In the case of line redundancy, the bus lines for the application are thus implemented transparently in duplicate. This means that the failure of a bus line can be tolerated without any restriction of functionality.

Master redundancy is usually implemented by the field bus system being built with a primary master and a backup master which are both connected to both lines A and B, provided that the field bus is also line-redundant. This implies a complete duplication of the master. The redundant master is transparent from the user's point of view, is thus not apparent in normal operation, and regardless of any existing line redundancy present. Existing slaves can be used without modification and are operated by one or the other master. Switching between the masters takes place without interruption and without loss of process data or re-initialization of the bus. This will ensure that outputs of the slaves do not decay and the operation can be continued without interruption or malfunction. A defective master can be replaced safely at any time. A newly inserted assembly is automatically calibrated and is available again after a short period of time. There is always exactly one master active, the redundant master is used as a backup in the event that the primary master fails.

According to the PROFIBUS standard, slave redundancy means e.g. that each slave has interface modules for all redundant structures, so for example, two interface modules for a line-redundant field bus with two lines A and B. In addition, the Slave has a redundancy communication channel (Red-Com). Redundant Slaves therefore comprise a primary communication interface and a backup communication interface, each with its own, different bus address assigned. The master always communicates with the primary communication interface and only to a limited extent with the backup communication interface. For example, in PROFIBUS only one slave interface may be active at any time, having regard to operational data transmission. In the event of a failure of only one PROFIBUS line or of only one connection, the communication with the other slave interface is resumed without any effect on the process outputs. Both communication interfaces perform a self-diagnosis and send their diagnostic information to the master, the diagnostic information of the backup interface being included in the diagnosis of the primary interface and being sent via this.

The master has a redundancy extension for monitoring the communication capacity of the redundant slave. If the redundancy extension of the master detects a fault in the communication with the primary slave, it sends a command to the backup communication interface, so that the system is switched over to the latter. In addition, a redundant slave can monitor its internal components, not related to the communication with the field bus, for certain error conditions and can switch over from the primary to the backup communication channel if an internal error is detected. The monitoring of interference in the communication always takes place via the master.

During operation, only one of the communication interfaces of the slave is active at any time, be it the primary or the backup communication interface, and only one interface is configured. When switching from one interface to the other the new interface can receive all of the necessary data on the redundancy communication channel Red-Com, or it must wait for the first data exchange with the master field device following the switchover. This can lead to undesired delay, because this type of redundancy requires two completely separate bus interfaces. These and more details of the Profibus slave redundancy are described in the specification "Slave Redundancy", version 1.2, November 2004, published by Profibus User Organization (www.profibuscentre.com.au/ducs/slave-redundancy.pdf).

In the prior art it is also known to equip serial bus systems which lack system-integrated redundancy means with an upstream connectable redundancy extension. A suitable device for this purpose is, for example, the Profibus Redundancy Link Module RLM01 from the ABB AG, Mannheim, Del. (http://www.abb.de/product/seitp334/289cb36695cb150dc12571c6002e1c0b.aspx), which is also described in EP 0 990 330 B1. This redundancy extension is a series connected device which can be inserted between a non-redundant master or slave field device and a line-redundant serial bus with two lines A and B. The module regenerates the signal shape and amplitude of all received data and monitors all lines for activity and error conditions. The initially incoming data in a line-redundant serial bus over line A or line B with a correct telegram start are forwarded by the redundancy extension module via an interface M to the master or slave field device. In the case of a data frame containing an erroneous telegram start sent on line A, the system is switched over to the still available redundant line B, and vice versa. Data blocks sent on the bus from the field devices via the redundancy extension module are passed through in parallel to the two lines A and B. A disadvantage of this known series connected device is first of all that, a separate, unwieldy device must additionally be installed in the field-bus device, one which also requires its own power supply as well as the manual setting of the bit rate.

In addition, the series connectable device introduces an additional delay into the data transfer, which is similar in its effect to an additional propagation delay. This is because the switching device requires a certain processing time for receiving and interpreting the data, in order to select the correct receiving line. For this purpose the reception of at least one byte is necessary which, for example according to the PROFIBUS standard, introduces a latency of at least 11 bit periods. Only once the redundancy extension module has decided which line A or B is selected as the receiving line will the data be forwarded to the actual field devices. For communication between the master and slave, which comprises sending at least one command from the master to the slave and sending back a response from the slave to the master, there will therefore be a delay of twice the minimum necessary time for processing a data frame, in the case of PROFIBUS 2×11 bits. Depending on the transmission rate, which in PROFIBUS can be e.g. in the range of 1.5 kBaud to 12 MBaud, this will result in delay times of the order of several microseconds. The delay of 11 bit periods per receive process has the same order of magnitude as the normal response time of the station, i.e. the response time is de facto doubled. Such delays can be highly relevant in time-critical process control tasks.

The ABB system has the additional disadvantage that it only examines the beginning of a data frame for communication errors, and does not take account of faults which may occur after the first character of a message. On the other hand, in this system a more comprehensive analysis of the received data blocks would lead to a still larger delay, which would also have a negative effect. Indeed, if a data block, so for example, a telegram, were to be completely examined for errors before the line selection is made, then it must be received completely before its onward transmission. The delay introduced would correspond to the length of the telegram, which in many cases would no longer be within the tolerance allowed by the protocol.

U.S. Pat. No. 6,594,227 describes a system for controlling the communication between different stations over a line-redundant Ethernet bus according to the TCP/IP protocol using a special type of management of the MAC addresses of a receiver, a transmitter and a network adapter.

US-A-2010/0290,339 also describes an Ethernet network in which in this case redundancy is created by the connections being provided in duplicate with each one being alternately addressable with the same network address.

DE 10 2010 015 455 A1 discloses a method for the redundant connection of a field device to a field bus, in which the network interfaces are also implemented with redundancy. Here also, the devices are controlled using a special management of the MAC addresses.

OVERVIEW OF EXEMPLARY EMBODIMENTS

The disclosure provides a bus subscriber device for connection to a line-redundant serial data bus, over which data are exchanged according to a predefined protocol. Examples of the disclosure have applications in field bus systems that implement asynchronous data transmission, such as PROFIBUS, those mentioned above and other field bus systems. The bus subscriber device comprises a data transmission unit, at least two data receiving units which are connected in parallel, a line selection logic and at least two bus communication interfaces for connecting to a corresponding number of lines of a line-redundant data bus. In exemplary embodiments, each of the data receiving units is connected to an associated line of the data bus via an assigned bus communication interface. The data receiving units have means for receiving a data block from the assigned line of the data bus and means for forwarding the received data block to the line selection logic. For its part, the line selection logic has means for selecting a line of the data bus as a receiving line and means for forwarding the data block received over the selected receiving line. The functional groups of the bus subscriber device can be implemented as hardware, firmware or software, or a combination of these.

Instead of the separate series connected component described above, as in the ABB system, and the externally controlled switching of the communication channels of the redundant slaves described above in accordance with the PROFIBUS standard, the present disclosure provides a PROFIBUS subscriber having integrated line selection, which thus supports self-sufficient line redundancy of a serial data bus. In exemplary embodiments the bus subscriber device is configured so that it can receive data packets in parallel at both data receiving units and, by analysis of the data packets, detect which line of the data bus offers the better reception quality. This line is then selected as receiving line. Criteria for the selection of the receiving line are, for example, protocol violations detected in data blocks which are received at both of the data receiving units, or even different propagation delays on the different lines of the redundant data bus.

The line selection logic is implemented in one example in a data processor that is contained in the bus subscriber anyway. Unlike the above-described system from ABB, the bus subscriber device therefore introduces no additional delay into the data processing or data reception, because each data block is received directly by the addressed bus subscriber without requiring the intermediate connection of the serial device, and is forwarded without additional delay to the line selection logic implemented in the data processor.

In one example, the data receiving units have means for analysing the received data blocks, and for outputting a data block status signal, in addition to the actual data contained in the data block. For example, this analysis of the received data blocks corresponds to the usual pre-processing of the data in the receiving unit of a field bus device, and in particular to the examination of the received data blocks for protocol violations of layer 2 of the OSI network layer model. As soon as the data processor receives a data block which contains no protocol violation, this triggers both the selection of the line of the data bus over which the error-free data block has been received as a receiving line, and also the received data block can then be processed according to the specification without additional delay. Reception, buffering and the forwarding of the data blocks to the data receiving units take place in accordance with the normal functioning of such receiving units in bus subscribers, wherein the bus subscriber device differs from the prior art by the duplication of the data receiving units as well as by the additional analysis of the received data blocks for line selection. The bus subscriber device therefore uses the components and intelligence present in standard field devices, and adapts to the standard processing methods of the field devices. All that is necessary is to duplicate the data receiving unit of the field device and to utilise the step of protocol checking, which is already inherently carried out in the processing of the data blocks anyway, for line selection.

In the simplest case, this means that a block of data which contains no protocol violations and is the first to arrive at one of the data receiving units, and therefore at the line selection logic, causes the associated line to be selected as the data line. This selection of the line of the data bus, as far as the reception of data blocks is concerned, is repeated for each received block, without any additional delay being produced. In practice a block of data typically corresponds to exactly one data frame or one data packet in accordance with a selected network protocol. The analysis is then carried out in each case after receiving a complete data packet.

In one embodiment the bus subscriber device comprises at least two timer devices, which are assigned to the at least two data receiving units. Each data receiving unit in the example therefore has its own timer device, in order actually to carry out the data transfer without any delay, asynchronously, as is explained in more detail below.

In this embodiment the data transmission unit works as follows: in principle, the data transmission unit is connected via the bus communication interfaces to all the lines of the data bus and sends data simultaneously on all lines, e.g. line A and B, of the data bus. In exemplary embodiments the data processor is set up such that depending on the result of the analysis, and hence depending on the selected receiving line of the data transmission unit, it assigns the timer device which belongs to the data receiving unit over which the previously selected data block was received. The data processor thus controls the data transmission unit such that it works at the same clock rate as the previously selected data receiving unit. The provision of separate timer devices for the data receiving units therefore enables not only the data receiving units to work in parallel and independently of each other, without introducing any additional delay for the double reception of the data block, but it also enables the data transmission unit to synchronize to the timer of the selected data receiving unit, and therefore to minimize the latency to be observed by the field device for sending response signals.

In one example the data receiving units are each set up to receive and buffer a complete data frame or a complete data packet, and the means for selecting a data line are configured such that they do not select a line of the data buses as a receiving line until after analysis of at least one complete data frame or data packet, in order to forward the data received on this line to the data processor. Depending on the currently valid data transmission protocol, a data packet, also referred to as a data frame, is usually characterized by a header followed by data bytes and a trailer. The header can contain a SoF (Start of Frame) byte, control bytes, destination, source, length of the frame and similar items. The trailer normally contains one or more test bytes and e.g. an EoF (End of Frame) byte. Unlike in the prior art, a complete data block or data frame is analysed for protocol violations, rather than just e.g. the first character or the first byte. This does not introduce additional delays however, because the data receiving units usually each buffer a complete data frame before it is passed on to the data processor.

The bus subscriber device can utilise the bit rate recognition usually existing in such devices, in order to determine the transmission bit rates for both data bus lines in parallel. A separate setting of the bit rate for the respective devices is not necessary.

Only exactly one bus address is assigned to each of the bus subscriber devices despite doubling of the data receiving units, and so each bus subscriber device is addressed as a single field device, unlike in the case of the redundant master or slave devices typically used in the prior art. This greatly simplifies the management of the bus subscribers. The bus subscriber device can be used in both master and in slave field devices.

The disclosure also provides a method for controlling the communication of a bus subscriber with a line-redundant serial data bus.

In the method, data are received in parallel at both data receiving units on a regular basis and sent via the data transmission unit in parallel on all lines of the redundant bus. The analysis and selection of the data blocks can be carried out as described above.

In one configuration however one of the lines of the data bus can also be preconfigured as the default receiving line, wherein a different line of the data bus is switched to as soon as a protocol violation is detected on the default receiving line or an intact data packet is received earlier on the other line. Both protocol violations as well as a delay in the reception of data packets can indicate temporary or permanent faults in one line of the data bus. Even without faults, however, the method ensures that it is always the "fastest" data packet, that is, the one that arrives first at one of the duplicated receiving units, which is selected by the data processor for further processing. This ensures that the operation of the field bus system is optimized both in terms of its reliability as well as its speed.

If corrupted data blocks are received at both data receiving units, e.g. data blocks which contain protocol violations, an appropriate error message is sent to the data processor.

For diagnosis and testing purposes either one of the data receiving units can be disabled. Even without such a deactivation, the bus subscriber device can provide information on the quality of reception on both lines if the data processor performs appropriate analyses and outputs their results.

DETAILED DESCRIPTION OF SOME EXAMPLES

Figure 1:
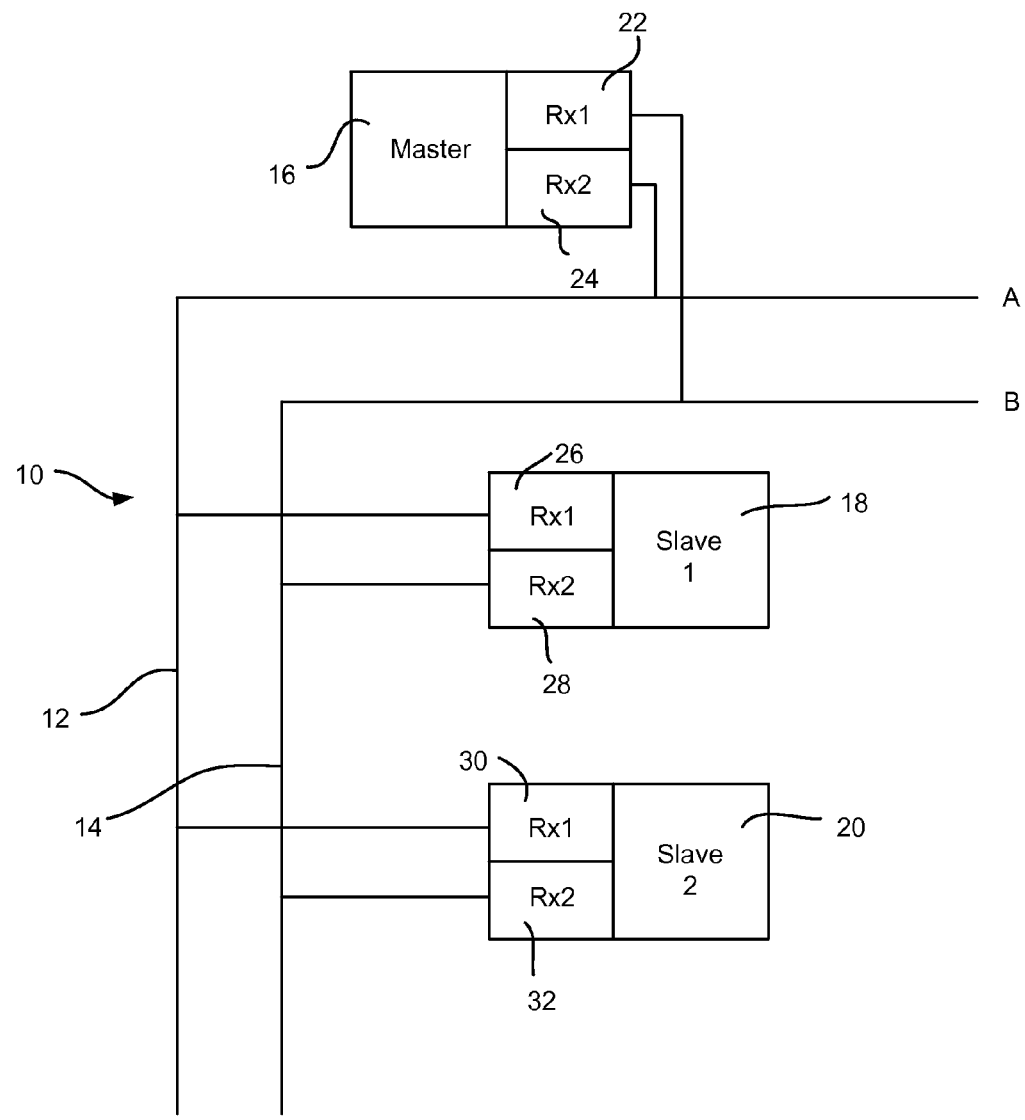
FIG. 1 shows a schematic representation of a bus topology of a line-redundant field bus system with master and slave field devices according to an example.

An exemplary application is a PROFIBUS network wherein the bus subscriber device is also applicable to other line-redundant asynchronous serial buses, in particular field bus systems. The bus system shown in FIG. 1 comprises a line-redundant field bus 10 with two lines 12 and 14, which are also labelled in the Figure as A and B. In the example shown, to the lines A and B are connected a master field device 16, in the following also referred to in brief as Master, and two slave field devices 18, 20, in the following also referred to in brief as Slave. All field devices 16, 18, 20 in the example shown are configured as bus subscriber devices and each have two parallel data receiving units 22, 24, 26, 28, 30 and 32. One of each of the receiving units 22, 26, 30 of the field devices 16, 18, 20, is connected to the line A, and the other receiving unit 24, 28, 32 is connected to the line B. Both receiving units of one field device 16, 18, 20 respectively are addressed using the same address on the field bus 10.

While FIG. 1 shows three field devices which are configured according to an example of the invention, it also falls within the scope of the invention to configure only a part of the field devices as defined in the claims. For example, it is possible to provide two completely separate, redundant master field devices, such as are known from the state of the art, and to configure only the slave field devices, or even just a part of the slave field devices, with two data receiving units. Furthermore, it is also possible to provide two redundant master field devices which are con-figured as defined in the claims, or also to combine redundant and non-redundant devices.

Figure 2:
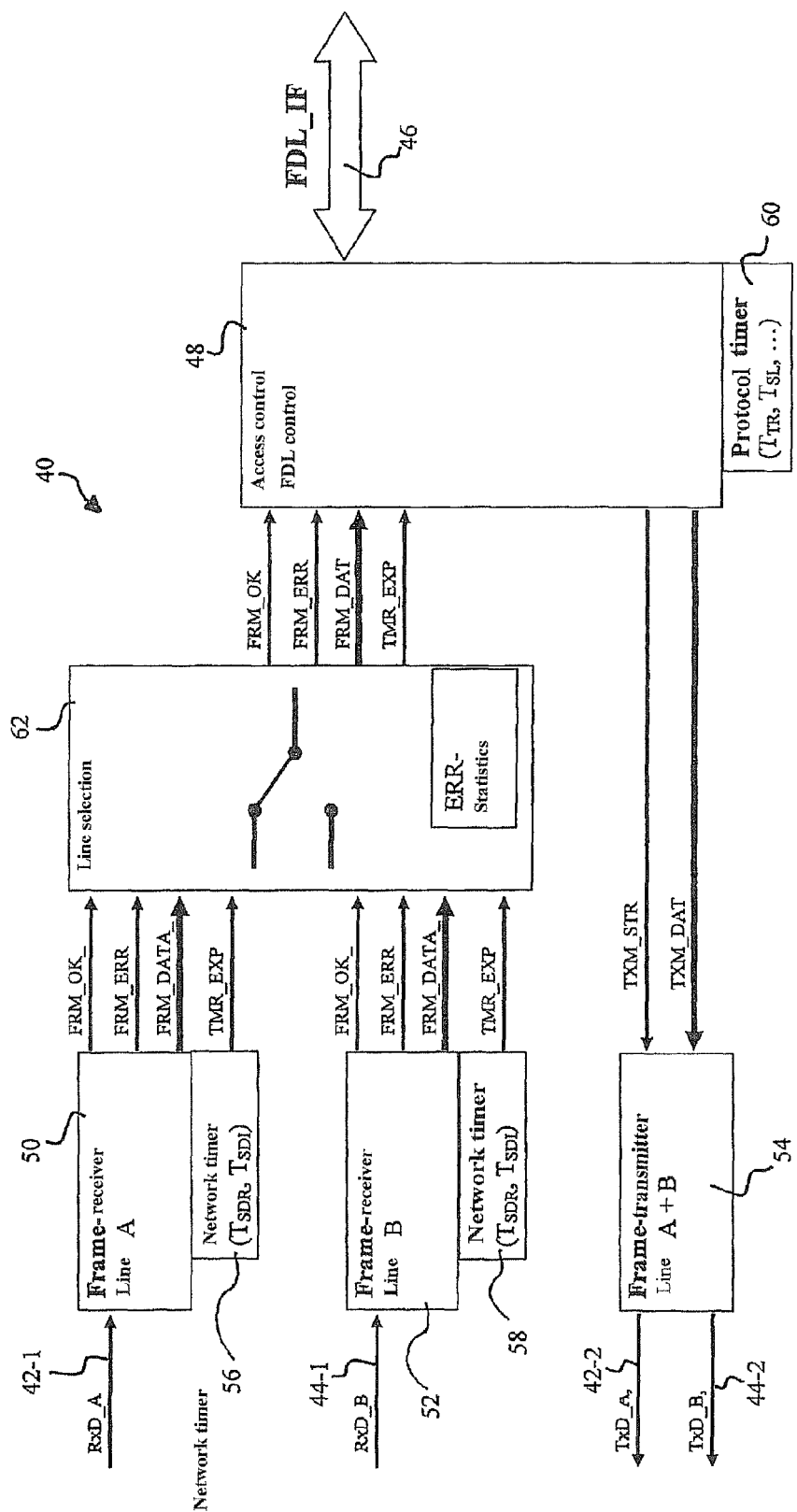
FIG. 2 shows a schematic block diagram of a bus subscriber device in accordance with an example.

FIG. 2 shows, in the form of a schematic block diagram, the structure of an exemplary bus subscriber device 40, which can be used either as the master or slave. The device 40 comprises two bus interfaces 42-1, 42-2 and 44-1, 44-2 to connect to the redundant lines A, B of the line-redundant field bus 10, as well as an interface 46 for connecting to a parent control device, for example, a process control unit, such as a programmable logic controller (PLC). Provided that the exemplary bus subscriber device 40 is implemented as a slave, the interface to the parent control device can be omitted. The bus interfaces 42-1, 42-2 and 44-1, 44-2 are represented in the Figure respectively by their receive (RX) connections 42-1 and 44-1 and their transmit (TX) connections 42-2 and 44-2. The device 40 also comprises a data processor 48, first and second data receiving units 50, 52, a data transmission unit 54 and three timer devices 56, 58, 60, as well as a line selection logic 62. The data processor 48 can be a standard controller for field bus communication, which performs the bus access control on the data link layer FDL (Fieldbus Data Link). In the selected example of a PROFIBUS network the data processor operates the bus access protocol and higher protocol layers, i.e. from layer 3 upwards, in accordance with the OSI layer model, including the necessary checks. The checking for protocol violations which relate to Layer 2 of the Protocol, in accordance with the OSI layer model, e.g. in a PROFIBUS network the FDL layer, takes place in the data receiving units 50, 52. The data receiving units 50, 52 are telegram-receiving units known per se, which in the exemplary device 40 however, unlike in the prior art, are provided in duplicate and operate in parallel. Each of the data receiving units 50, 52 has a dedicated network timer 56, 58 assigned to it. A further protocol timer 60 is provided for the data processor 48. Depending on the protocol used, more than one timer per line may also be provided. In the present example, for example, three timers per line are provided for a PROFIBUS master, while for a PROFIBUS slave one timer per line is sufficient. The data transmission unit 54 in turn is a known data transmission device of a field device. Since the data receiving units and associated timers are implemented twice and operate in parallel, it is not necessary to arrange an additional communication channel for exchanging data between these, and neither is such a device provided.

The exemplary device 40 operates as follows: at any given time on each of line A 42-1 and line B 44-1 a data packet RxD_A and RxD_B respectively are received, the data packet RxD_A on line A being received and buffered by the first data receiving unit 50 and the data packet RxD_B on line B 44 received and buffered by the second data receiving unit 52. After receipt of a complete data packet RxD, this is checked in the respective data receiving units 50, 52 for correctness or violation of the Layer 2 protocol, and the data receiving units 50, 52 both forward the received data packet FRM_Data_A resp. FRM_Data_B on to the data processor 48, and in addition output status signals that indicate whether a packet has been received correctly. In the example shown, these status signals include FRM_OK_A or FRM_OK_B to signal the correct receipt of a data packet, FRM_ERR_A or FRM_ERR_B for signalling a faulty receipt of a data packet, and TMR_EXP_A or TMR_EXP_B for signalling a timeout of the associated network timer 56 or 58.

In the example shown, the received data packet and the status signals are passed to the line selection logic 62, which in practice can be implemented as part of the data processor 48, but which is shown separately for reasons of clarity. The line selection logic 62 selects for further processing the data packet FMR_DATA_A or FMR_DATA_B, which is error-free and the first to be received by the line selection logic 62, and forwards this together with the status signals for further processing in the data processor 48. This transfer takes place almost without any additional delay. The data processor 48 receives the package just as it was output by one of the data receiving units 50, 52. In addition, in the line selection logic 62 a set of error statistics can be maintained, which records which lines A or B have been selected when and how often, and which types of errors have occurred on which line and how often.

If one of the data packets FPM_DATA_A or FRM_DATA_B received over lines A and B has a protocol violation, then the other data packet is simply used for the further processing of the data transferred, which can contain status data, control data, parameters, etc. If none of the data packets received on the A and B lines has protocol violations, the data packet selected for further processing is the one which was first forwarded by one of the data receiving units 50, 52. The non-selected packet is discarded.

If both packets arrive at the line selection logic 62 at exactly the same time and are free of errors, the same line is selected as for the last packet. Thus, if the data traffic on both lines A and B of the redundant data bus is error-free, the first incoming data packet is always used for the further processing, and it is possible that in the exemplary method another line A or B is selected as the receiving line for each data block. The line selection is independent of whether or not more faults have been found on a certain line in the past.

After the receipt and processing of a data packet, the bus subscriber device 40 usually sends a response packet, this occurring via the data transmission unit 54 in parallel on both lines A and B. To control the bus access the data processor 48 sends the data to be sent TXM_DATA and a bus access signal TXM_STRT to the data transmission unit 54, which then outputs the transmitted data TXT_A and TXT_B and a bus access request (request to send) RTS_A and RTS_B on both lines A and B of the field bus.

In order to process the data communication in parallel over the two data receiving units 50 and 52 and over the data transmission unit 54 without delay, in the example at least one dedicated timer device 56, 58 is assigned to each data receiving unit 50, 52, the two timers 56, 58 running asynchronously and independently of each other. For sending data via the data transmission unit 54, in each case the timer device is selected which was assigned to the previously selected data receiving unit 50 or 52. The control of the data transmission unit 54 with the timer device of the selected data receiving unit ensures that the times specified by the data transfer protocol for the sending of response signals are exactly complied with for the selected receiving line, i.e., in the case of error-free reception of the data packets, for the faster data line. This leads to a further optimization of the performance of the field bus system.

The device 40 of the example also uses the bit rate detection usually implemented in field devices for controlling the communication via the data receiving and sending units 50, 52 and 54.

While the known method from ABB for line selection described above only analyses the first character or the first byte of a data block, here a complete data frame, hence a complete data packet which contains a large number of bytes, is evaluated in order to decide over which line the data are received. This makes the method much more reliable.

The invention has the additional advantage that it also allows an evaluation of the quality of the transmission lines A and B, for example, in a downstream CPU, if the data processor 48 or the line selection logic 62 records e.g. the history of the lines A and B used as receiving lines. In addition, for diagnostic purposes it is possible to disable individual data receiving units 50 or 52 and to receive data only via one of the lines A and B. The data transmission unit is largely unchanged compared to known devices.

The features disclosed in the above description, the claims and the drawings can be significant for the realization of the invention in its various configurations both individually and in any desired combination.

LIST OF REFERENCE LABELS

10 Data Bus
12, 14 Bus line A, B
16, 18, 20 Bus subscriber device
22, 24, 26, 28, 30, 32 Data receiving unit 40 Bus subscriber device
42, 44 Bus communication interfaces
46 PC interface
48 Data Processor
50, 52 Data receiving unit
54 Data transmission unit
56, 58, 60 Timer device

The invention claimed is:

1. A bus subscriber device for connection to a line-redundant serial data bus, over which data are exchanged according to a predefined protocol, having the following features:
   a data transmission unit,
   at least two data receiving units that are connected in parallel,
   a line selection logic, and
   at least two bus communication interfaces for connecting to a corresponding number of lines of the data bus,
   wherein each of the data receiving units is connectable via an associated bus communication interface to an assigned line of the data bus and has a receiver for receiving a data block from the associated line of the data bus and a forwarding unit for forwarding the received data block to the line selection logic, and wherein the line selection logic has means for selecting one line of the data bus as a receiving line and forwarding the data block received over the selected receiving line, wherein each of the at least two data receiving units is associated with a dedicated timer device; and
   wherein the timer device which is associated with the data receiving unit for the selected receiving line is assigned to the data transmission unit.

2. Bus subscriber device according to claim 1, additionally having a data processor for controlling the bus access, wherein the line selection logic is implemented as part of the data processor.

3. Bus subscriber device according to claim 1, wherein the data receiving units have means for analysing the received data blocks, and for outputting a data block status signal.

4. Bus subscriber device according to claim 3, wherein the means for analysing the received data blocks are designed to analyse the data blocks in relation to protocol violations.

5. Bus subscriber device according to claim 1, additionally having a data processor for controlling the bus access, wherein the line selection logic is implemented as part of the data processor, and wherein the data transmission unit is connectable via the bus communication interfaces to the lines of the data bus.

6. Bus subscriber device of claim 1, wherein the data receiving units are configured to each receive and buffer a complete data frame, and wherein the line selection logic is configured to select one line of the data bus as a receiving line, only after the evaluation of at least one complete data frame, in order to forward the data frames received on this line.

7. Bus system having a line-redundant, serial data bus, over which data are exchanged according to a pre-defined protocol, and having a bus subscriber device for connection to the line-redundant serial data bus according to claim 1, wherein the bus subscriber device has exactly one bus address assigned to it, wherein the bus subscriber device is a master or a slave field device.

8. Method for controlling the communication of a bus subscriber with a line-redundant, serial data bus, over which data are exchanged according to a predefined protocol, wherein the bus subscriber has a data processor, a data transmission unit which is coupled to the data processor, at least two data receiving units which are connected in parallel and coupled to the data processor, and at least two bus communication interfaces for connecting to a corresponding number of lines of the data bus, the method including:
   receiving a data block at each data receiving unit via an assigned bus communication interface,
   analysing the data blocks received by the data receiving units in the bus subscriber and selecting a line of the data bus as a receiving line depending on the result of the analysis, and
   forwarding of the data block received by the corresponding data receiving unit via the selected receiving line to the data processor, wherein at least one dedicated timer is assigned to each of the at least two data receiving units; and
   wherein the timer which is assigned to the data receiving unit for the selected receiving line is selected for controlling the data transmission unit.

9. Method according to claim 8, wherein the data receiving units analyse the received data blocks and output a data block status signal.

10. Method according to claim 8, wherein the data blocks are analysed in relation to protocol violations.

11. Method according to claim 8, wherein the data receiving units each receive and analyse a complete data frame and forward it to a line selection logic, and wherein a line of the data bus is selected as a receiving line only after the evaluation of at least one complete data frame.

12. Method according to claim 8, wherein the data are sent on both bus communication interfaces of the data transmission unit.

13. Method according to claim 8, wherein exactly one bus address is assigned to each subscriber.

14. Method according to claim 8, wherein on receipt of error-free data blocks at both data receiving units, the line over which the associated data block is received first is selected as a receiving line.

15. Method according to claim 8, wherein on receipt of corrupted data blocks at both data receiving units an error message is sent to the data processor.

16. Method according to claim 8, wherein the data processor performs a bit rate detection.

17. Method according to claim 8, wherein for diagnostic and testing purposes one of the data receiving units is disabled.

18. Method according to claim 8, wherein a data block corresponds to a data packet, in particular to a data frame in accordance with the PROFIBUS standard.

* * * * *

UNITED STATES PATENT AND TRADEMARK OFFICE
CERTIFICATE OF CORRECTION

PATENT NO.         : 8,812,759 B2                                             Page 1 of 1
APPLICATION NO.    : 13/790129
DATED              : August 19, 2014
INVENTOR(S)        : Josef Luttenbacher It is certified that error appears in the above-identified patent and that said Letters Patent is hereby corrected as shown below:

On the Title Page, item (54) and in the Specification, Col. 1 (Title), delete "BUS SUBSCRIBER DEVICE FOR CONNECTION TO A LINE-REDUNDANT DATA BUS, AND METHOD FOR CONTROLLING THE COMMUNICATION OF A BUS SUBSCRIBER WITH A LINE-REDUNDANT SERIAL DATA BUS", and insert -- BUS SUBSCRIBER DEVICE FOR CONNECTION TO A LINE-REDUNDANT SERIAL DATA BUS, AND METHOD FOR CONTROLLING THE COMMUNICATION OF A BUS SUBSCRIBER WITH A LINE-REDUNDANT SERIAL DATA BUS --, therefor.

Signed and Sealed this
Sixth Day of January, 2015

Michelle K. Lee
*Deputy Director of the United States Patent and Trademark Office*